Aug. 22, 1961 J. A. MITCHELL 2,997,042
HANDLE WARMER FOR FISHING RODS AND THE LIKE
Filed Oct. 22, 1957 3 Sheets-Sheet 1
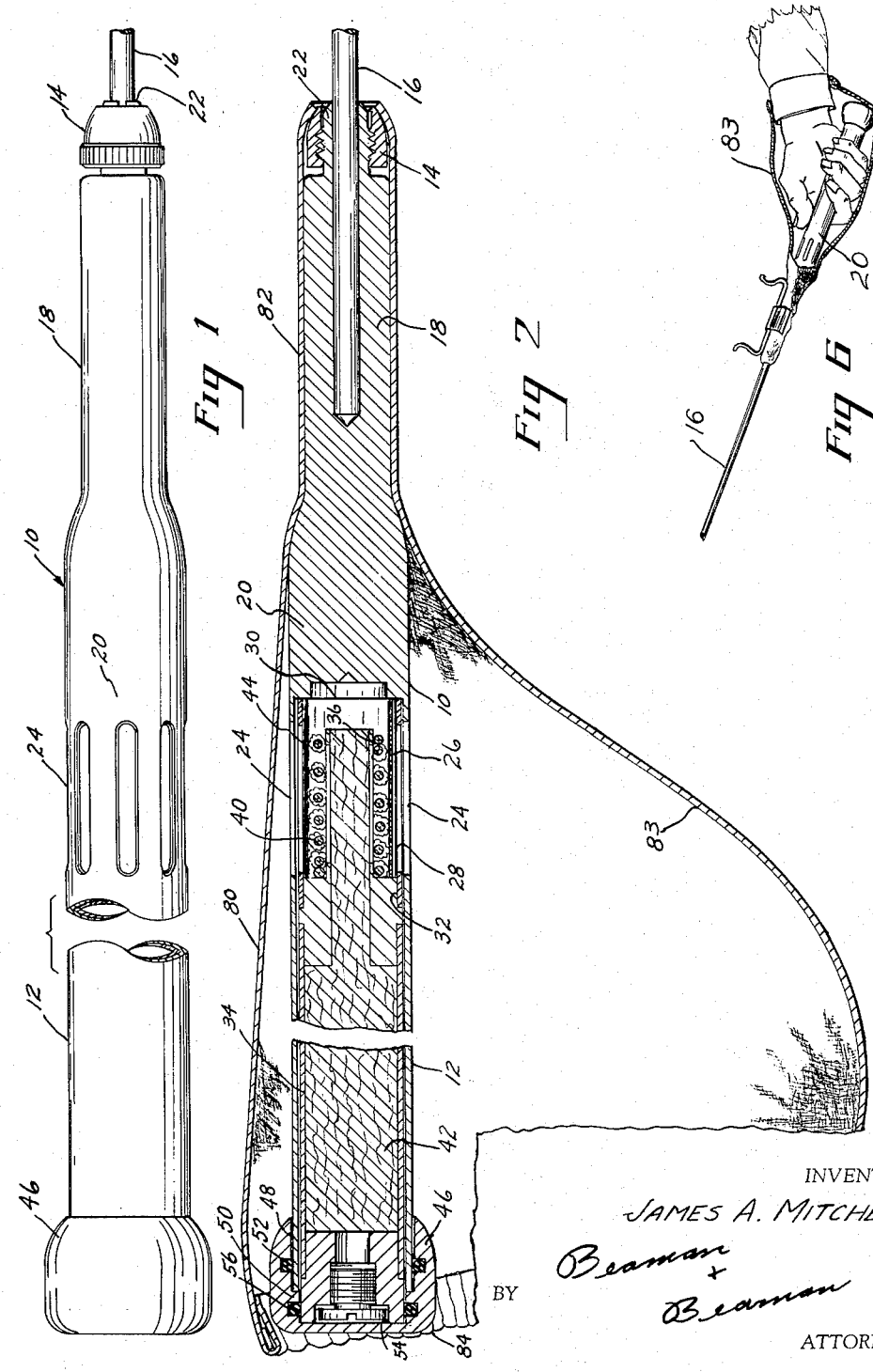
INVENTOR
JAMES A. MITCHELL
BY Beaman + Beaman
ATTORNEY Aug. 22, 1961     J. A. MITCHELL     2,997,042
HANDLE WARMER FOR FISHING RODS AND THE LIKE
Filed Oct. 22, 1957     3 Sheets-Sheet 2
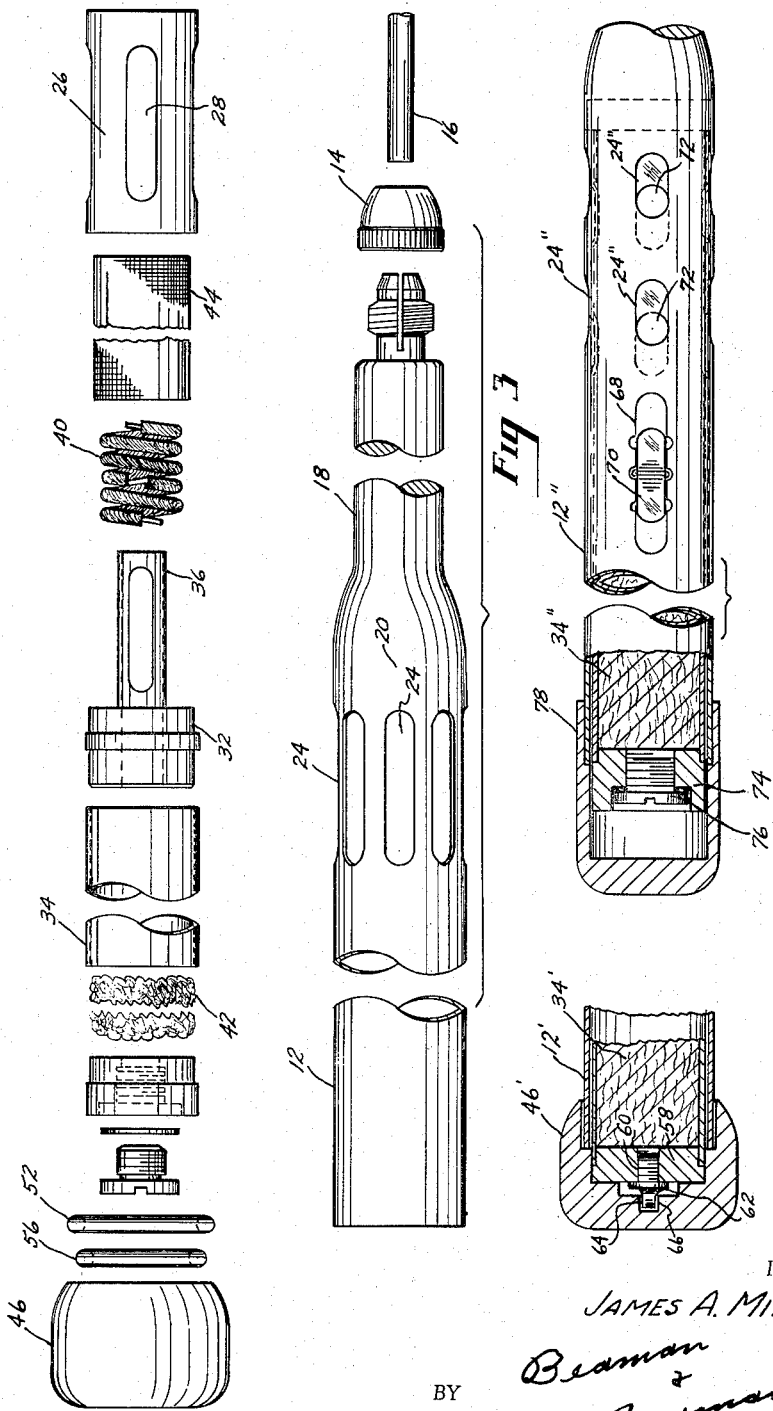
INVENTOR
JAMES A. MITCHELL
BY Beaman & Beaman
ATTORNEY Aug. 22, 1961 J. A. MITCHELL 2,997,042
HANDLE WARMER FOR FISHING RODS AND THE LIKE
Filed Oct. 22, 1957 3 Sheets-Sheet 3
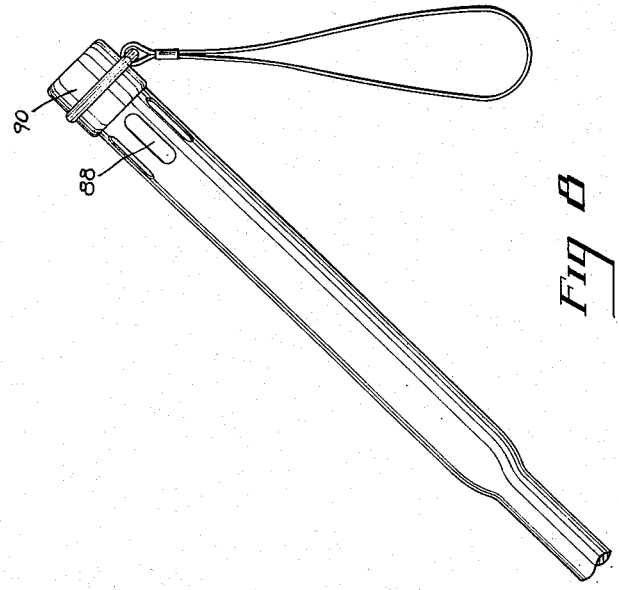
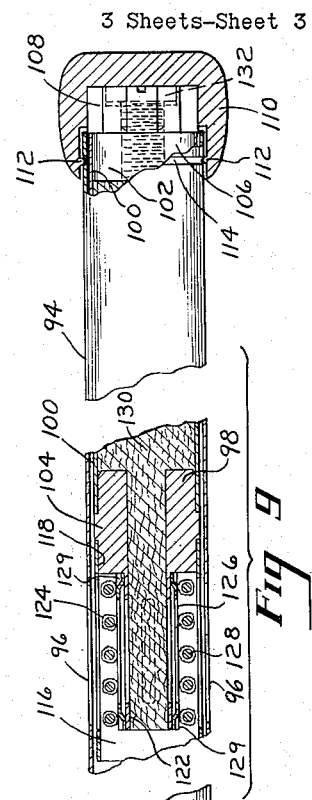
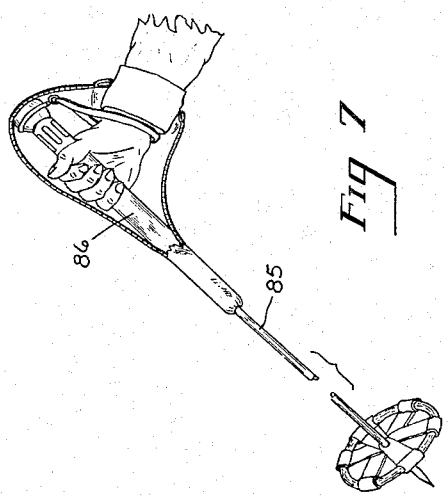
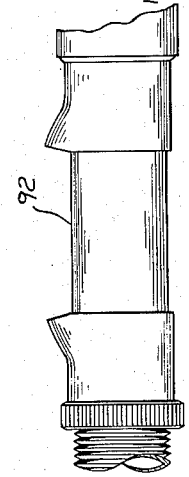
INVENTOR
JAMES A. MITCHELL
BY Beaman & Beaman
ATTORNEY

United States Patent Office 2,997,042
Patented Aug. 22, 1961

2,997,042
HANDLE WARMER FOR FISHING RODS AND THE LIKE
James A. Mitchell, Clark Lake, Mich., assignor to Vapor Chemical Company, Rives Junction, Mich., a corporation of Michigan
Filed Oct. 22, 1957, Ser. No. 691,710
3 Claims. (Cl. 126—208)

The present invention relates to improvements in handles and particularly handles upon devices used out of doors in cold weather, being well adapted to fishing rods, ski poles and other out of door sporting goods and devices, and is characterized by having associated therewith a hand warmer. Reference is made to United States Patent No. 2,758,592 over which the present invention is deemed to be an improvement.

Each of the several illustrated embodiments of the invention involve the same basic structural design, namely, an outer tubular handle portion, an inner removable burner unit in the form of an elongated tubular fuel chamber having a burner element at one end. Draft openings are provided in the handle in opposed relation to the burner element. Where the rate of operation of burner element is to be regulated, the tubular fuel chamber carries a draft regulator embracing the burner element and an adjustment knob disposed at one end of the outer handle portion. The location of the draft opening and draft regulator relative to the adjustment knob will depend upon the type of device upon which the invention is to be applied. For example, in an ice fishing rod the burner element will be located at one end of the elongated tubular fuel chamber and the adjustment knob will be located at the opposite end. In a ski pole, the knob and burner element are preferably located at the same end of the tubular fuel chamber.

To improve the usefulness of the present invention a fabric mitt is provided which snuggly embraces the handle in which the handle is disposed and the mitt is enlarged to receive the hand through a hand opening which is preferably adjustable. It is anticipated that the mitt has usefulness in combination with a handle with or without warming structure associated therewith.

An object of the invention is to provide a dual purpose handle for out of door equipment such as fishing rods, ski poles, etc., in which all the utility of the usual handle is retained while functioning as a hand warmer.

Another object is to provide an improved hand warmer handle for fishing rods, ski poles, etc., in which the supply of oxygen to the burner may be regulated in order to control the rate of burning.

Another object of the invention is to provide a handle having a warmer disposed therein which may be readily regulated, easily ignited and will function without interruption as long as the draft remains open or until such time as the fuel supply is exhausted.

A still further object is to provide a handle for out of door equipment having a heater mounted therein and a draft regulating knob at one end of the handle.

A still further object is to provide an improved accessory handle for out of door equipment comprising the combination with a handle of an exterior mitt and an interior warmer.

A still further object of the invention is to provide an improved mitt for association with the handle for out of door equipment.

A still further object of the invention is to provide an improved burner element of the type described in which saturation of the element by the fuel supply has been obviated and malfunction resulting from that cause has been eliminated.

These and other objects and advantages residing in the combination and construction and arrangement of parts will more fully appear from the following specification and claims.

In the drawings,
FIG. 1 is a side elevational view of a fishing rod handle embodying the present invention, the mitt being shown removed,
FIG. 2 is a cross-sectional view of FIG. 1 with the mitt shown in position,
FIG. 3 is an exploded view of the components of the assembled structure of FIG. 1,
FIG. 4 is a fragmentary cross-sectional view of a modified form of the invention,
FIG. 5 is a fragmentary view partially shown in section of a modified form of the draft regulation,
FIG. 6 is a perspective view showing the relationship of the mitt applied to an ice fishing rod when embracing the handle and hand of the fisherman,
FIG. 7 is a view similar to FIG. 6 of a ski pole equipped with the invention,
FIG. 8 is an enlarged fragmentary elevational view of the ski pole of FIG. 7, and
FIG. 9 is a side elevational view of a casting rod embodying the invention and showing further modification and structural details.

Referring to the drawings, in the form of the invention shown in FIGS. 1 and 2, the fishing rod comprises a handle 10 having a hand portion 12 at one end, a blade chuck 14 at the opposite end to hold the flexible blade 16, a reel or line holder 18 of reduced diameter adjacent the chuck 14 and a warmer portion 20 between the reel portion 18 and the hand warmer portion 12. In practice, the handle 10 is preferably fabricated from aluminum by means of impact extrusion to provide a thin wall tubular part of one diameter defining the hand and warmer portions 12 and 20 and a solid portion of stepped down diameter defining the reel portion 18 the end portion from which the jaws 22 gripping the blade 16 are formed. The chuck 14, jaws 22 and blade 16 are all of well known construction in the fishing rod art and form no part of the present invention per se.

The handle 10 has one or more draft openings 24 formed therein. A draft regulator member 26 has one or more openings 28 adapted to be brought into adjustable register with the openings 24. As shown, the member 26 is of tubular form opened at one end and closed at the opposite end 30. The opened end of the member 26 is press fitted into the reduced cylindrical shoulder 32 of the burner structure hereinafter described.

The burner and draft adjustment structure housed in the handle 10 in the illustrated form of FIGS. 1 to 3, inclusive, comprises an elongated tubular fuel container part 34, a tubular shoulder 32 of less diameter than the part 34 and a slotted tubular burner core 36. Burner element 40 may take any suitable form as, for example, the form of a helical coil of asbestos fiber impregnated with a suitable catalyst and having a suitable wire core or other reinforcing structure. The catalytic agent may be platinum black or palladium black and aids in the oxidization of the fumes from the liquid fuel contained in a suitable absorbent material 42 in the part 34 and causes combustion at a low rate, all of which is well known. The liquid fuel may be of any one of several volatile fuels such as methanol. To sustain the combustion, a fine wire sleeve 44 may embrace the element 40 although good results have been obtained without the employment of the sleeve 44. Such a modification is shown in FIG. 9 as will be hereinafter more fully described. As shown, the absorbent material 42 extends into the core 36 to enable capillary action to bring the fuel from the container part 34 into the burner zone where it is vaporized and is subjected to the catalytic action of the burner structure.

At the butt end of the handle 10 of the rod is a tri-purpose knob 46 which is in the form shown as a stepped bore 48 and a shoulder 50. The hand portion 12 has a sliding, rotary fit within one stepped portion of the bore 48 and abuts the shoulder 50. An elastomeric O-ring 52 forms a seal between the knob 46 and the interior of the hand portion 12. Container part 34 extends beyond the hand portion 12 to have sliding engagement within the second stepped portion of the bore 48 and to abut the end wall 54 of the knob 46. A second elastomeric O-ring forms a seal between the knob 46 and the interior of the container part 34 and provides a friction drive between the part 34 and the knob 46 to enable the part 34 to be rotated within the hand portion 12 upon relative rotation between the knob 46 and the hand portion 12. In this manner, the draft regulator member 26 may be rotated to control the openings 24 and, as a result, the rate of burning. To refuel the container part 34, the knob 46 is removed from the hand portion 12 and the fuel is poured into the part 34 with the butt end of the hand portion 12 elevated. It will be understood that the member 26 has a close fit within the hand portion 12 so as to effectively regulate the size of the openings 24 yet permits free rotation relative to the hand portion 12, through rotation of the knob 46 by means of the friction drive between the knob 46 and the container part 34. Obviously, a positive connection may be provided between the manipulating means constituted by the knob 46 and the part 34 without departing from the invention and such modifications are disclosed in the forms of FIGS. 4 and 9.

In FIG. 4 the container part 34' has a closed end 58 having a threaded filler opening 60. A filler screw 62 having a winged head 64 is shown screwed into the opening 60. The knob 46' is shown of molded elastomeric material which snugly embraces the protruding end of the part 34' and has a recess 66 into which the head 64 of the screw 62 has a driving fit. Upon rotation of the knob 46' relative to the hand portion 12' and in a direction tightening the screw 62 will result in the part 34' being positively driven. To fill the container part 34' with fuel the knob 46' is removed from the hand portion 12' and part 34' and the screw 62 is then removed.

FIG. 5 shows a further modification of the invention in which the fuel container 34" is axially moved relative to the hand portion 12" in order to regulate the draft openings 24". With this arrangement, an elongated opening 68 is provided in the hand portion 12" in order to receive a radially projected depressible button 70 carried in a suitable recess defined in the exterior surface of the container part 34". By depressing and pushing on the button 70 the part 34" is axially moved within the hand portion 12" to bring the draft openings 72 into and out of register. The end of the part 34" may be provided with a threaded press fitted plug 74 and a filler screw 76. The knob 78 snugly engages the end of the hand portion 12" and may be removed to give access to the screw 76. A filler plug and filler screw may be used in the form of FIG. 1 in lieu of a sealing ring 56.

As shown in FIG. 2 a mitt 80, preferably of close woven fabric to provide protection against the weather and to contain the head of the burner element 40, has a portion 82 which snugly embraces the reel portion 18 prior to installing the reel or line winder thereon. The form of the mitt 80 is then enlarged at 83 to comfortably receive the hand, with the hand opening at 84 being provided with an elastic or gathered hem so as to snugly embrace the wrist.

It is to be understood that while the invention in the forms above described has been shown applied to a fish rod handle that this is by way of illustration only. The principles of the invention may be applied to handles of various types and forms and it is especially adapted to out of door devices and equipment. For example, as shown in FIGS. 7 and 8, a ski pole 85 is shown with the handle 86 having the draft openings 88 located adjacent the upper end of the pole 85. This is for the reason that the position in which the pole 85 is normally disposed in use is such that it is desirous that the burner occupy an up position when in use.

With the draft openings 88 located adjacent the adjustment knob 90, the knob 90 will be attached to the burner element end of the tubular fuel chamber located within the handle rather than at the end opposite the end to which the burner is carried in the forms shown in FIGS. 3 and 9. The knob 90 may be connected to the burner element in any suitable manner and the knob 90, in turn, attached to the handle 86 in any suitable manner as to avoid unintentional removal of the burner unit yet permit draft adjustment through rotation of the knob 90. The same general arrangement of FIG. 9 may be employed in this respect, namely, a non-circular mating socket or recess and a projection connection between the burner unit and the knob with a snap on relatively rotatable connection between the knob 90 and handle 86, as will be more fully described with regard to FIG. 9.

To describe the form of FIG. 9, the invention is shown applied to a casting type fishing rod having a reel seat 92 above the tubular hand portion 94. Directly below the seat 92, draft slots 96 are provided in the hand portion 94. The burner unit 98 comprises an elongated fuel chamber defined by a tube section 100 having press fitted connection at opposite ends with a filler plug 102 and a burner core 104. The plug 102 has a circular portion 106 which is tightly fitted into one end of the tube section 100 to form a fluid seal therewith, there being an extension portion 108 thereof which is preferably non-circular and which mates within a complementary non-circular recess or socket in the knob 110. The knob 110 is closely fitted over the butt end of the hand portion 94 with a relative rotational fit. Projections 112 on the inner surface of the knob 110 are provided to snap into annular groove 114 on the hand portion 94 upon relative axial movement between the knob 110 and the hand portion 94, the material from which the knob 110 and hand portion 94 are fabricated having sufficient resiliency to be distorted and permit a snap or connection to take place. With this arrangement the knob 110 is removably held upon the hand portion 94 yet may be rotated relative thereto. Upon relative rotation of the knob 110, the mating between the non-circular portions of the knob 110 and plug 102 will cause rotation of the tube section 100 and burner core 104.

A slotted draft regulator 116 is removably carried upon the cylindrical portion 118 of the burner core 104 and rotatable therewith as a unit to regulate the draft slots 96 in the hand portion 94. The burner core 104 has a slotted elongated portion generally designated 122 which supports the burner element 124. In the illustrated form of the invention, the burner element 124 comprises a slotted tubular arbor 126 upon which the impregnated and coated burner wire 128 is wound.

To avoid capillary saturation of the burner wire 128 by the fuel held within the fuel chamber and burner core by the absorbent material 130, the cylindrical surface of the arbor 126 carrying the burner wire 128 is held in spaced relation to the portion 122 by circumferentially spaced radially extending teats 129 formed from the longitudinally split arbor 126 which is preferably of spring metal and frictionally connected to the portion 122.

By positioning the burner wire 128 out of capillary association with the fuel absorbent material 130 disposed within the burner core 104, starting difficulties that have heretofore been experienced with the burner units under certain operating conditions have been avoided.

To service the burner unit disclosed in FIG. 9 with fuel and to ignite the same, the hand portion 94 is gripped in one hand and the knob 110 is gripped in the other hand. A substantially axial pull upon the knob 110 relative to the hand portion 94 will produce sufficient distortion to enable the projections 112 to free themselves from the annular groove 114 and the knob 110 may then be removed from the hand portion 94 along with the burner unit 98 housed within the tubular hand portion 94. If desired, the non-circular portion 108 of the burner unit 98 may have a snug frictional fit with the mating recess or socket in the knob 110 to assist in removing the burner 98 from the hand portion 94. With the burner 98 removed from the hand portion 94 and the filler screw 132 exposed by the removal of the knob 110, the filler screw 132 can then be rotated and removed by insertion of a screw driver or the like into the slotted head of the screw 132. With the burner unit 98 held with the filling end up, fuel is poured into the fuel chamber where it is taken up by the absorbent material which fills the tube section 100 and the burner core 104. Upon filling, the filling screw 132 is then tightly replaced.

To light the burner unit 98, the draft regulator 116 is removed and the burner element saturated with fuel. With the burner unit 98 in an upright position the saturated burner element is ignited and allowed to blaze until the flame is nearly out and is then blown out. Following a short generation period the draft regulator 116 is replaced and the burner unit 98 is inserted into the hand portion 94 and the knob 110 applied to the burner unit 98 as well as to the hand portion 94. Thereafter rotation of the knob 110 will adjust the draft and rate of heating. It will be understood that there is no capillary saturation of the burner element by the fuel carried by the absorbent material in the illustrated form of FIG. 9 due to the spacing function of the teats on the arbor 126. After ignition, only generated fumes from the fuel supply will function to maintain the slow combustion that takes place in the combustion zone defined by the burner element.

Having thus described my invention, what I claim is new and desire to protect by Letters Patent is:

1. A fishing rod handle comprising a reel mounting portion, a hand portion, a draft portion between said reel mounting and hand portions, said hand and draft portions being tubular, a warmer assembly mounted within said tubular portion of said hand portion including a fuel container, a burner located at one end of said container within said draft portion, a knob mounted upon the other end of said container, a draft regulator for said draft portion mounted upon and movable as a unit with said container to control the draft, said knob being rotatably supported upon said hand portion, and said container and regulator being rotatably actuated through said knob.

2. A warmer comprising a fuel container, a burner attached to one end of said container, absorbent fuel containing material disposed within said container and burner, said burner comprising a support structure with an interior surface circumferentially encompassing a portion of said absorbent and having means spacing the major portion of said interior surface therefrom, and a burner element circumferentially disposed about said support and held in spaced relation relative to the absorbent of said burner.

3. In an independent, hand supported fishing rod handle having a blade at one end, a hand portion defined on said handle removed from said blade end, a warmer having a burner disposed within said handle, said burner being located in said handle adjacent said blade end and disposed outwardly from said hand portion and an exterior flexible mitt encompassing said handle and affixed thereto adjacent said blade end having an enlarged opening adapted to receive a hand embracing said hand portion.

References Cited in the file of this patent

UNITED STATES PATENTS

| | | |
|---|---|---|
| 214,796 | Thompson | Apr. 29, 1879 |
| 1,337,946 | O'Neill | Apr. 20, 1920 |
| 2,675,798 | Rosmarin | Apr. 20, 1954 |
| 2,758,592 | Phipps | Aug. 14, 1956 |
| 2,816,539 | Church | Dec. 17, 1957 |

FOREIGN PATENTS

| | | |
|---|---|---|
| 66,836 | Switzerland | Jan. 5, 1914 |